Figure 1:
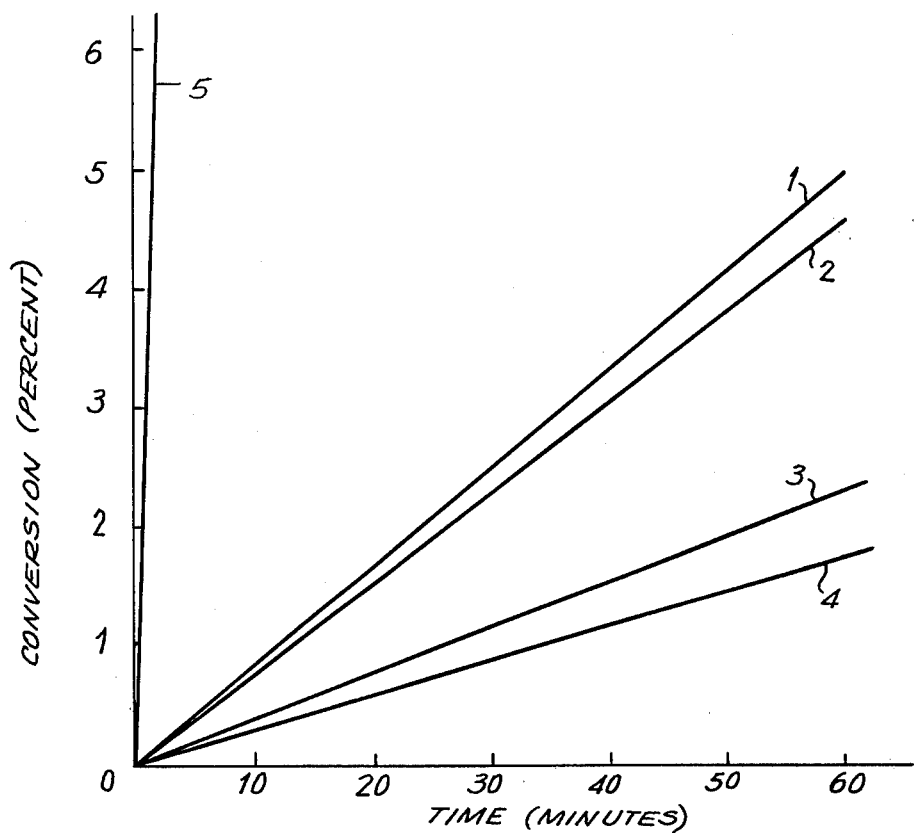

United States Patent [19]

Hitzler et al.

[11] 4,279,719

[45] Jul. 21, 1981

[54] PHOTOPOLYMERIZATION METHOD WITH SYMMETRIC AZO ALKANES

[75] Inventors: Otto Hitzler, Erzhausen; Winfried Wunderlich, Rossdorf, both of Fed. Rep. of Germany

[73] Assignee: Röhm GmbH, Darmstadt, Fed. Rep. of Germany

[21] Appl. No.: 47,769

[22] Filed: Jun. 12, 1979

[30] Foreign Application Priority Data

Jul. 15, 1978 [DE] Fed. Rep. of Germany ....... 2831159

[51] Int. Cl.$^3$ ..................... C08F 2/50; C07C 107/02
[52] U.S. Cl. ........................... 204/159.23; 260/192; 526/218
[58] Field of Search ................................. 204/159.23

[56] References Cited

U.S. PATENT DOCUMENTS 4,048,423  9/1977  MacLeay et al. ................... 526/209

FOREIGN PATENT DOCUMENTS 2130070  12/1972  Fed. Rep. of Germany .

Primary Examiner—John C. Bleutge
Assistant Examiner—Arthur H. Koeckert
Attorney, Agent, or Firm—Curtis, Morris & Safford

[57] ABSTRACT

What is disclosed is the polymerization of free radically-polymerizable compounds such as acryl compounds and methacryl compounds under the influence of light having a wave length from 200 nm to 500 nm in the presence of a symmetric azo compound comprising tertiary aliphatic hydrocarbon groups each having a molecular weight of 71 to 97 bound to the azo group, whereby the polymerization temperature can be maintained under 100° C. by regulation of the light intensity.

6 Claims, 2 Drawing Figures

PHOTOPOLYMERIZATION METHOD WITH SYMMETRIC AZO ALKANES

The present invention relates to a method for the photopolymerization of ethylenically unsaturated compounds, polymerizable by a free-radical mechanism, in the presence of certain symmetric azo compounds.

It is known in the art to photopolymerize ethylenically unsaturated compounds in the presence of azo compounds which can be decomposed by light in the wavelength region from 20 nm to 500 nm, at temperatures from 20° C. to 100° C., to form free radicals. These azo compounds first thermally decompose at temperatures of 150° C.–300° C. to form free radicals if light is exluded. Azo initiators of this type, for example 2,2'-azo-bis-isobutyl acetate, permit carrying out the polymerization of unsaturated compounds at temperatures below 100° C. in a manner strictly proportional to the amount of light radiated into the system. An undesirable increase in temperature during polymerization can be avoided in this method if the intensity of the light employed is constantly so apportioned that thermal decomposition of the azo initiator does not occur. However, the aforementioned azo initiators, which have a high decomposition temperature and which permit a polymerization controlled solely by the amount of light at favorable polymerization temperatures, can only be prepared with difficulty and are expensive.

If other light-excitable azo initiators such as azo-isobutyronitrile are used, thermal decomposition of the initiator begins already at relatively low temperatures. The thermally-produced radicals initiate the polymerization of the unsaturated compounds and bring about a constant temperature increase which, because of the progressive acceleration of the initiator decomposition, can lead to an explosive course of the reaction.

Using azo initiators of the aforementioned type, a photopolymerization which is controllable solely by the amount of light used for irradiation is limited to a temperature region which clearly lies below the region of thermal decomposition of the azo initiator, for example 20° C. or less. However, at such low temperatures the polymerization proceeds undesirably slowly.

The object of the present invention is to polymerize ethylenically unsaturated compounds which are polymerizable by a free-radical mechanism in the presence of other azo compounds under the influence of light having a wavelength from 200 nm to 500 nm using a light intensity such that the polymerization occurs at temperatures below 100° C. This object is achieved according to the present invention by the use of certain azoalkanes. These, like azo-bis-isobutyl-acetate, for example, permit a photopolymerization controlled by the light intensity but are more easily prepared and, consequently, cheaper.

The azo initiators used according to the invention are known in the art from J. Hinz et al., Liebigs Ann. Chem. 765, 95–109 (1972) and W. Duisman et al., Liebigs Ann. Chem. 1976, 1820–1833. They contain two similar tertiary aliphatic hydrocarbon groups having a molecular weight from 71 to 97 bound to the azo group. The carbon atom bound to the azo group is tertiary, i.e. it carries three acyclic (i.e. linear, straight chain or branched) aliphatic hydrocarbon groups of which two can be joined to form a ring. The hydrocarbon groups contain at least 5 and at most 7 carbon atoms, but in the latter case only when including a ring structure to have the formula $C_7H_{13}$, whereas hydrocarbon groups of the formula $C_7H_{15}$, without a ring structure, are unsuitable.

Preferred azoalkanes have the formula

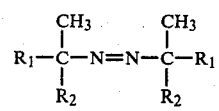

wherein either $R_1$ is methyl and $R_2$ is ethyl or propyl, or $R_1$ and $R_2$ together signify a tetramethylene group or a pentamethylene group.

2,2'-azo-bis-2-methyl-butane and 2,2'-azo-bis-2-methyl-pentane are particularly preferred.

The azoalkanes are preferably used in an amount from 0.001 g to 1 g per 100 g of the polymerizable compound. The azoalkanes used according to the invention are obtainable in a simple manner according to the process described by R. Ohme et al. in Angewandte Chemie 77, 429 (1965). One starts from the corresponding alkyl amines, converts them into the corresponding sulfuric acid-dialkyl amines, and oxidizes them with hypochlorite to the corresponding azoalkanes. The method of preparation is not a feature of the present invention.

The method of the invention is not limited to a particular polymerization method. Solution polymerization or pearl polymerization, for example, can be carried out under the influence of light. Preferably, however, the method is used for the bulk polymerization of unsaturated compounds, particularly in layer thicknesses of 30 mm to 300 mm, since in just this method the control of the polymerization temperature by means of the amount of light is particularly important because of the difficulty of cooling.

The free radicals which are formed on decomposition of the azo compounds of the invention are known to be suitable for the polymerization of all ethylenically unsaturated free radically-polymerizable compounds. Thus, the method of the present invention can be used without limitation for all such compounds and their mixtures or solutions. The preferred field of use of the invention, particularly with a view to bulk polymerization, is for the polymerization of acryl compounds and/or methacryl compounds or for the polymerization of mixtures of various polymerizable compounds predominantly comprising acryl compounds and/or methacryl compounds. Among the methacryl compounds, methyl methacrylate has the greatest importance.

To be sure, the polymerization can be carried out at low temperature, e.g. 20° C. However, polymerization temperatures in the region from 50° C. to 100° C. are technically more advantageous. In general, fully employing whatever cooling possibilities exist, the polymerization temperature is permitted to climb to a point such that the boiling point of the monomers is still not reached and then the polymerization temperature is kept at the same level by turning the light source off and on. Optionally, this can be carried out automatically by means of a switching arrangement controlled by temperature sensors.

A better understanding of the present invention and of its many advantages will be had by referring to the following specific Examples, shown by way of illustration.

PREPARATION OF TYPICAL AZOALKANES (A) 2,2'-azo-bis-methyl-butane.

119.2 g (0.5 mol) of 2,2'-sulfamido-bis-2-methylbutane (from N-tert.-pentylamine and $SO_2Cl_2$ in pentane) are added to a solution of 40 g NaOH in 1500 ml of a 12.5 percent sodium hypochlorite solution and, after addition of 400 ml of n-pentane, are stirred at 35° C. for 24 hours with 40 ml of tert.-butanol. The pentane phase is then separated, the aqueous phase is extracted three times with 100 ml portions of n-pentane, and the combined pentane solutions are dried. Distillation in vacuum gives 2,2'-azo-bis-2-methyl-butane in high yield. b.p.$_{5.0}$=54° C.; $n_D^{20}$=1.4300.

(B) 1,1'-dimethyl-azocyclopentane 26 g (0.1 mol) of 1,1'-sulfamido-bis-1-methylcyclopentane [prepared from 1-methyl-cyclopentylamine and $SO_2Cl_2$ in pentane, cf. J. Hinz, et al., Liebigs Ann. Chem 765, 94 (1972)] are added to a solution of 8.0 g of NaOH in 300 ml of 12.5 percent of sodium hypochlorite solution and, after the addition of 80 ml of n-pentane and 8 ml of tert.-butanol, are stirred at 35° C.–40° C. for 24 hours. Isolation of the azo compound, as described in the previous Example, gives a yellowish liquid, $n_D^{20}$=1.4650.

(C) 2,2'-azo-bis-2-methyl-propane 67.5 g (0.5 mol) of sulfuryl chloride, dissolved in 75 ml of n-pentane, are added dropwise over the course of three hours to a solution of 146.2 g (2 mol) of tert.-butylamine in 250 ml of n-pentane at 5° C.–20° C. After the reaction, 200 ml of distilled water are slowly added. The resulting precipitate is suction filtered, washed with water, and dried. Yield: 70 percent of theory. m.p. after recrystallization from benzene=141° C.

The sulfamide is oxidized with sodium hypochlorite as described above. After distillation, b.p $_{56}$=40° C. The latter is obtained in 75 percent yield. $n_D^{20}$=1.3961.

(D) 2,2'-azo-bis-2,4,4-trimethyl-pentane 57.7 g (0.18 mol) of 2,2'-sulfamido-bis-2,4,4-trimethyl-pentane, prepared as described in the previous Examples (m.p.=80° C.), are oxidized with sodium hypochlorite solution for 20 hours at 35° C. The isolated product, 2,2'-azo-bis-2,4,4-trimethyl-pentane is purified by distillation in vacuum. Yield=50 percent of theory. b.p.$_{0.8}$=88° C. $n_D^{20}$=1.4450.

EXAMPLES OF POLYMERIZATION

Example 1

A 3 M solution of methyl methacrylate in benzene was polymerized with 0.02 mol per liter of 2,2'-azo-bis-2-methylbutane under the influence of light in the wave length region of 300 nm of 400 nm of an ultraviolet light (Philips TLA 20 W/05) at 80° C.

The course of conversion with time is shown in accompanying FIG. 1 as curve 1. A rate of polymerization is observed which is more than twice as high as those observed under the same conditions using the same amount of 2,2'-azo-bis-2-methylpropane or 2,2'-azo-bis-2-methyl hexane. The time-conversion curves for these polymerizations are also shown in FIG. 1 as curve 3 and curve 4, respectively.

Example 2

Example 1 is repeated with the difference that 2,2'-azo-bis-2-methyl-pentane is used instead of 2,2'-azo-bis-2-methyl-butane. The course of polymerization is shown as curve 2 in FIG. 1.

Example 3

Example 1 is repeated with the difference that n-butyl acrylate is polymerized instead of methyl methacrylate. The overall polymerization rate was 3.1 percent per minute. The time-conversion curve of this reaction is also shown in FIG. 1 as curve 5.

Example 4

Figure 2:
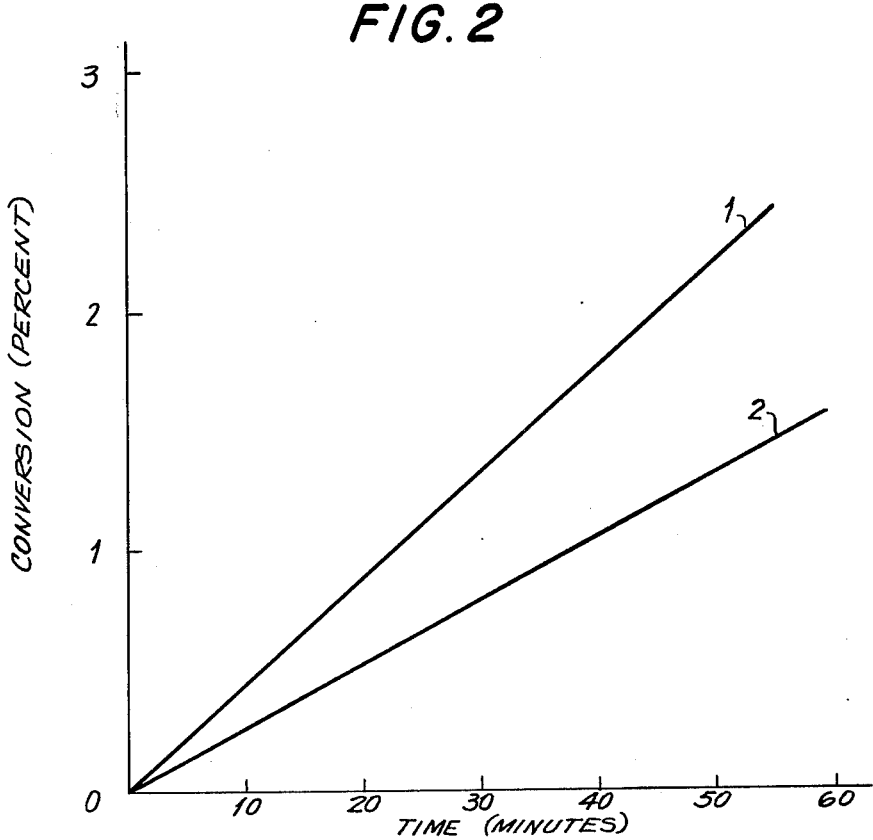

A 3 M solution of styrene in benzene was polymerized with 2,2'-azo-bis-2-methyl-butane under the conditions in Example 1. With 2,2'-azo-bis-methyl-butane, a clearly higher rate of polymerization is obtained then when using 2,2'-azo-bis-2-methyl-propane. The time-conversion function for these two polymerization reactions are shown in FIG. 2 as curve 1 and curve 2, respectively.

Example 5

Methylmethacrylate is polymerized, with the exclusion of oxygen, with 0.01 percent of 2,2'-azo-bis-isovaleronitrile and 0.005 percent of 2,2'-azo-bis-2-methyl-pentane under pressure and adiabatically starting at 25° C. The temperature rises to about 110° C. The 2,2'-azo-bis-valeronitrile is fully decomposed by this method so that the polymerization stops. After cooling of the sample to room temperature, the sample is fully polymerized by the influence of light on the still-undecomposed 2,2'-azo-bis-2-methyl-pentane. The temperature in the polymerizing mass is controlled by a dosing of the radiation. If 2,2'-azo-bis-2-methylpentane is replaced by 2,2'-azo-bis-2-methyl-4,4-dimethyl-pentane, which has a smaller thermal stability, the polymerization goes out of control already in the first step.

Example 6

Methyl methacrylate is polymerized in a layer thickness of 12 cm with 0.01 percent by weight of 2,2'-azo-bis-2-methylbutane at a bath temperature of 16° C. At a conversion rate of 2 percent per hour, an interior temperature of 20° C. is produced until a conversion of about 30 percent is reached. Thereafter, the interior temperature climbs quickly and is maintained constant at 60° C.–70° C. by reducing the amount of light energy radiated into the system. As soon as about 80 percent conversion is reached, the light energy is again increased and the polymerization is carried out to conclusion at about 110° C. The block so formed is optically clear and shows no bubble inclusions. This is not the case if 2,2'-azo-bis-2-methyl-butane is replaced as a photoinitiator by 2,2'-azo-bis-2-methyl-4,4-dimethyl-pentane. In the latter case, the interior temperature of the block, after a conversion of more than 30 percent, cannot be held below 70° C. by a decrease in the light introduced. Rather, the polymerization goes out of control because of thermal decomposition of the initiator and the temperature climbs to over 150° C. A final product containing bubbles is formed.

What is claimed is:

1. A method for photopolymerizing an ethylenically unsaturated free radically-polymerizable compound which comprises irradiating said compound, in admixture with a symmetric azoalkane comprising tertiary alkyl groups each having a molecular weight from 71 to 97 bound to the azo group, with light having a wavelength from 200 nanometers to 500 nanometers at such a light intensity that the polymerization occurs at temperature below 100° C.

2. A method as in claim 1 wherein said azoalkane is present in an amount from 0.001 g to 1 g per 100 g of the polymerizable compound.

3. A method as in claim 1 wherein said azoalkane is a compound of the formula

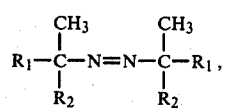

wherein either $R_1$ is methyl and $R_2$ is ethyl or propyl or $R_1$ and $R_2$, taken together, are tetramethylene or pentamethylene.

4. A method as in claim 3 wherein said azoalkane is 2,2'-azo-bis-2-methyl-butane or 2,2'-azo-bis-2-methyl-pentane.

5. A method as in claim 1 wherein said polymerizable compound is predominantly an acryl compound or a methacryl compound.

6. A method as in claim 5 wherein said methacryl compound is methyl methacrylate.

* * * * *